(12) United States Patent
McCormick et al.

(10) Patent No.: US 9,269,041 B2
(45) Date of Patent: Feb. 23, 2016

(54) HARDWARE ENHANCEMENTS TO RADIAL BASIS FUNCTION WITH RESTRICTED COULOMB ENERGY LEARNING AND/OR K-NEAREST NEIGHBOR BASED NEURAL NETWORK CLASSIFIERS

(71) Applicant: in2H2, Folsom, CA (US)

(72) Inventors: Bruce K. McCormick, Folsom, CA (US); Bill H. Nagel, Folsom, CA (US); Chris J. McCormick, Santa Barbara, CA (US); Mick Fandrich, Folsom, CA (US)

(73) Assignee: in2H2, Folsom, CA (US)

( * ) Notice: Subject to any disclaimer, the term of this patent is extended or adjusted under 35 U.S.C. 154(b) by 297 days.

(21) Appl. No.: 14/060,426

(22) Filed: Oct. 22, 2013

(65) Prior Publication Data

US 2015/0112910 A1 Apr. 23, 2015

(51) Int. Cl.
  *G06N 3/02* (2006.01)
  *G06N 3/04* (2006.01)
(52) U.S. Cl.
  CPC ... *G06N 3/04* (2013.01); *G06N 3/02* (2013.01)
(58) Field of Classification Search
  None
  See application file for complete search history.

(56) References Cited

U.S. PATENT DOCUMENTS

2011/0307228 A1 12/2011 Kasabov
2012/0303564 A1 11/2012 Dobson et al.

FOREIGN PATENT DOCUMENTS

KR 102013003773 A 4/2013
WO WO-2010080611 A2 7/2010
WO WO-2015061244 A1 4/2015

OTHER PUBLICATIONS

Sui, et al., A Restricted Coulomb Energy (RCE) Neural Network System for Hand Image Segmentation, 2011 Canadian Conference on Computer and Robot Vision, 2011, pp. 271-277.*
"CM1K hardware User's Manual", CogniMem® Technologies, Inc. Version 2.5.1, 59 pgs.
"International Application Serial No. PCT/US2014/061451, International Search Report mailed Jan. 20, 2015", 3 pgs.
"International Application Serial No. PCT/US2014/061451, Written Opinion mailed Jan. 20, 2015", 7 pgs.
Janik, P. et al., "Automated classification of power-quality disturbances using SVM and RBF networks", IEEE Transactions on Power Delivery, vol. 21, No. 3, (Jul. 2006) 1 pg. Abstract Only.

* cited by examiner

*Primary Examiner* — Wilbert L Starks
(74) *Attorney, Agent, or Firm* — Schwegman Lundberg & Woessner, P.A.

(57) ABSTRACT

This disclosure describes embodiments for a hardware based neural network integrated circuit classifier incorporating natively implemented Radial Basis functions, Restricted Coulomb Energy function, and/or kNN to make it more practical for handling a broader group of parallel algorithms.

41 Claims, 14 Drawing Sheets

EXAMPLE BITS COMPARED FROM ALL VECTORS (WIRE OR'D)

BIT POSITIONS
(BIT-9 IS HIGHEST ORDER BIT)
(COMPARISONS START FROM HIGHEST ORDER BIT)

| 9 | 8 | 7 | 6 | 5 | 4 | 3 | 2 | 1 | 0 | NEURONS |
|---|---|---|---|---|---|---|---|---|---|---------|
| 1 | 1 | 1 | 0 | 0 | 1 | 1 | 0 | 1 | 0 | DISTANCE 1 |
| 1 | 1 | 1 | 0 | 0 | 1 | 0 | 0 | 1 | 1 | DISTANCE 2 |
| 1 | 1 | 1 | 0 | 0 | 1 | 0 | 1 | 0 | 1 | DISTANCE 3 |
| 1 | 1 | 1 | 0 | 0 | 1 | 1 | 1 | 0 | 0 | DISTANCE 4 |

NOTE: A "0" REPRESENTS A LOW SIGNAL, A "1" REPRESENTS A HIGH SIGNAL

STEP 1. EACH NEURON PLACES ITS HIGHEST ORDER DISTANCE BIT ON THE BUS (10 BITS SHOWN). IF ALL 1's (HIGH) OR ALL 0's (LOW), GO TO NEXT BIT.

STEP 2. IF BITS ARE DISSIMILAR, THE ONE (S) WITH A "0" CONTINUE TO PARTICIPATE IN THE COMPARISON, CONTINUE WITH STEPS 1 AND 2 UNTIL ONE VECTOR DISTANCE REMAINS (SMALLEST).

STEP 2A. WHENEVER NEURON(S) DROP OUT, KEEP TRACK OF WHICH BIT IT DROPPED OUT ON

STEP 3. AFTER FINDING THE LOWEST DISTANCE, RETURN TO THE POINT WHERE ONE OR MORE DISTANCES DROPPED OUT AND START THE NEXT SEARCH FROM THERE, ELIMINATING THE NEED TO RE-START FROM THE HIGHEST ORDER BIT TO FIND THE SECOND CLOSET, THIRD, ETC.

IN THE ABOVE EXAMPLE:
- ON THE 7TH COMPARISON (BIT-3, AFTER 7 CLOCKS), THE NEURONS WITH DISTANCES 1 AND 4 WILL DROP OUT (FLAG)
- ON THE 8TH COMPARISON (BIT-2, AFTER 8 CLOCKS), THE NEURON WITH DISTANCE 3 WILL DROP OUT AND FLAG
- THE NEURON WITH DISTANCE 2 IS THE LOWEST AND WINS
- THE ALGORITHM WILL RETURN TO THE NEURON WITH DISTANCE 3 FLAG FOR THE NEXT LOWEST
- THE ALGORITHM WILL THEN GO TO THE NEURONS WITH DISTANCES 1 AND 4 AND RESUME ON THE 9TH COMPARISON (RESUME ON BIT-2)

*Fig 8A*

HARDWARE ENHANCEMENTS TO RADIAL BASIS FUNCTION WITH RESTRICTED COULOMB ENERGY LEARNING AND/OR K-NEAREST NEIGHBOR BASED NEURAL NETWORK CLASSIFIERS

TECHNICAL FIELD

This disclosure relates to hardware embodiments that improve the utility and performance of neural network algorithms such as Radial Basis Function (RBF) with Restricted Coulomb Energy (RCE) learning and/or k-Nearest Neighbor (kNN) in a digital data processing environment. These improvements may include modifications that expand RBF/RCE, kNN based neural networks to include, for example, support for probabilistic computations, additional neural network algorithms such as K-Means, and recommender algorithm features, all of which may be embedded on chip. These improvements may also include hardware support for filing systems, swapping in and out meta data or vectors of data to improve use in a multi-purpose/multi-user environment.

BACKGROUND

Machine learning and recognition is a field of study and applications whereby machines, in the form of dedicated hardware, computing software or combinations thereof, learn the key features and characteristics of objects. The objects may be physical in nature, examples of which are digitized images of automobiles or human faces. The objects may also be non-physical in nature, examples of which are sets of digital information representing the shopping information of customers. The characteristics of the objects are provided to the machine in the form of digital arrays of data that are known as feature vectors, or simply "vectors". Individual elements of the feature vectors are known as components. The machine is capable of holding many such feature vectors, and may use one of many algorithms from the field of neural networks during learning to assign the feature vectors to a class of objects. The machine may be capable of holding and analyzing un-related sets of data, with the data sets known as a "context". For example, it may contain a group, or context of feature vectors related to automobiles and another context containing feature vectors related to consumer spending habits. The Machine could direct new feature vectors requiring analysis to the appropriate context. A context may be further sub-divided into categories.

Once the machine has learned an appropriate number of features, the characteristics of new objects are given to the machine in the form of vectors for classification; that is, to determine if the new object belongs to a class of previously learned objects. The machine may use one or more algorithms from the field of neural networks to determine the closeness (conversely, distance) of a new feature vector to the learned feature vectors. The distance between a learned vector and a new observed vector is often performed using a form of Euclidian or Manhattan distance calculation and results aggregation. One example distance calculation is the Manhattan L1 norm distance, also known as the "taxi cab" distance. Another distance calculation is the Euclidian L2 norm. A third example is Lmax or L∞. A machine performing this analysis may be known as a classifier.

For machine learning to be increasingly practical in today's digital environment it needs to be conducive to various data widths and resolutions, support averaging and probabilistic calculations, as well as have the capability to swap in and out "files" (or classes of learned data) to support multi-user and/or multipurpose application scenarios. The machine may also be required to perform these tasks at very high rates of speed.

Hardware implementations of neural network algorithms saw significant interest in the 1980's but predominantly took the approach of weights in a multi-layer perceptron. Many of these solutions were analog in nature. Recent efforts in this space have rekindled an interest in analog and "spiking neurons" that try to conform very closely to biological brain cells. These approaches—using weights in a multi-layer perceptron and spiking neurons—are a different approach from that of the 1980s, may also be digital in nature, but are different than the Radial Basis Function (RBF) and Restricted Coulomb Energy (RCE) algorithms approaches. IBM subsequently patented and pursued early generations of a hardware implementation for the base RBF/RCE/kNN architecture. The more practical approach disclosed herein may be well suited for heterogeneous environments, or in some cases, standalone environments.

Disclosed herein are circuits and functions that will enhance an RBF/RCE/kNN based architecture. Their usefulness in a general computing environment performing digital memory based "fuzzy" operations in a hardware implementation offers significant performance improvements made by emulating the important computational attributes of neural networks without the issues of trying to emulate unnecessary biological functions. Software simulations that use von Neumann compatible data types and techniques may more readily transition to parallel memory based and scalable computational approaches with these RBF/RCE, kNN embodiments. Embodiments of multiple performance embodiments are also set forth herein.

BRIEF DESCRIPTION OF THE DRAWINGS

Some embodiments are illustrated by way of example and not as a limitation in the figures of the accompanying drawings, wherein the same components in the various figures bear the same reference numerals.

FIG. 8A is a diagram illustrating an enhanced search and sort technique, according to an embodiment.

DETAILED DESCRIPTION

Figure 1:
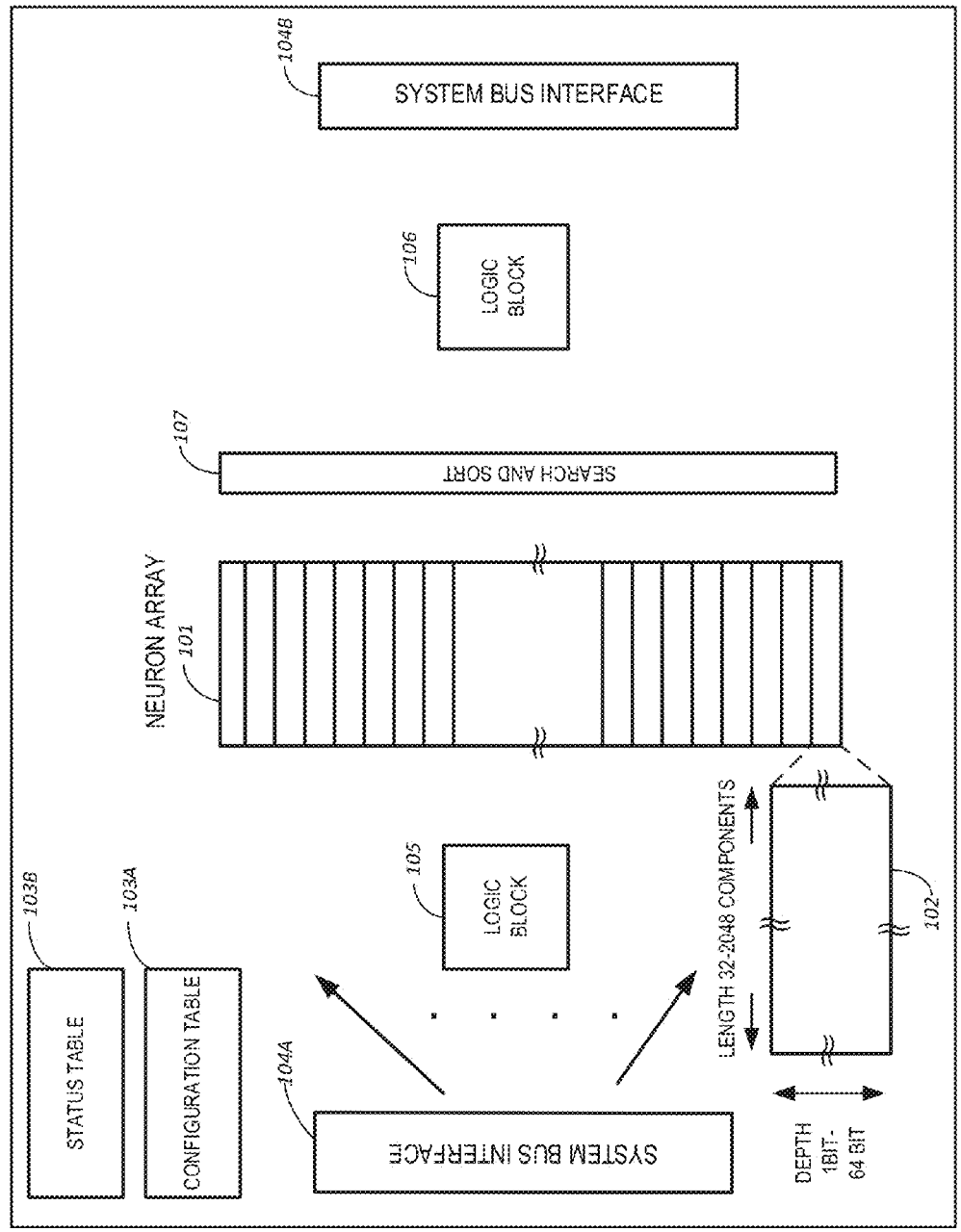
FIG. 1 is a diagram of an integrated circuit, according to an embodiment.

Numerous hardware embodiments are disclosed herein to be included in part in, in all of, or as part of other additional hardware embodiments to make an RBF/RCE and/or kNN non-linear classifier more amenable for heterogeneous inclusion to existing computing environments for broader algorithm support, support for multiple data types and improved performance. For example, when recognizing an object in an image, it may be desirable on one hand to be able to encompass a vector of image data that has 24 bit color field information per pixel (component resolution) with a vector length of 2048 components for high definition images for comparison to other images, while also being useful for Gray scale (8 bits), sound files or other various data files in data mining. Hash functions of 32 bytes (32 components with 8 bits per component such as SHA-32 for example) are another example of supporting multiple data types for generality on a single scalable architecture.

Numerous improvements are made to speed pre- and post-processing of data and results. In prior embodiments, these pre- and post-processing functions are performed by the host computer in a software algorithm. Significant performance improvements are made through the addition of pre-processing hardware, in the form of either dedicated hardware or a programmable controller, which may perform a number of functions on an incoming vector. As an example, this pre-processing hardware may improve the performance of the system by filtering the data to perform feature extraction before comparison to the stored vectors.

Post-processing hardware, in the form of either dedicated hardware or a programmable controller, are included to improve system performance. An example is the Bayesian probabilistic statistical analysis on the results prior to presenting the information to the system.

The system interface may be enhanced to allow ease of communication to standard memory interfaces or DMA support logic to local memory for fast transfers to various standard memory types.

An integrated status table may enable faster system performance by providing consolidated information of the chip's status to the operating system. For example dynamic status information of the number of neurons committed to different contexts, and the number of contexts that are on the chip are examples of system performance enhancements for using the chip in a multipurpose environment.

An integrated configuration table may also allow the operating system to configure the various parameters of the device, including but not limited to the algorithm to be used during learning and recognition, the length and depth of the neurons, and the masking mode and mask to apply to incoming vector data. The configuration table may also store factory device configuration information, for example, how many neurons are on the chip, a manufacturer's ID, and device performance information.

Improvements to supported algorithms or additional algorithms may also be included. An example is support for K-Means clustering wherein cluster points are chosen for comparison to a set of data points. One such use of this improvement is that these un-clustered data points are stored in the neuron array with the intent of finding the nearest cluster point of N cluster points being submitted. These N cluster points are submitted to the chip to determine which cluster point the stored data point is closest to. An historical association is kept as each new cluster point presents itself. The neuron then updates the cluster data point that it is associated with the new cluster point if the new cluster point is closer than a previously observed cluster point. Another use of the logic block for post processing in this example application may be to calculate new N-prime cluster points with the sorted data in the neuron array through averaging.

Another algorithm embodiment is integration of a recommendation engine where it is desirable to compare relevant information between two "customers" or clients to determine if one's buying patterns is applicable to another's for recommendation by excluding in the calculations comparisons of fields (components) where there is no common experience (represented as a "0" in the component field).

Support for system performance embodiments may be incorporated in many ways. One such embodiment is previously patented search and sort method U.S. Pat. No. 5,740,326 entitled "Circuit for Searching/Sorting Data in Neural Networks," which is incorporated herein by reference in its entirety, and comparing individual bits from highest order to lowest with all distances participating in a "wired OR" fashion. To enhance this approach for subsequent closest matches, such as a k-Next Neighbor ("k-NN") algorithm where k is greater than one), it is desirable to keep track of when the neuron dropped out of the wired OR comparisons,. A modified binary search may be performed as discussed below, allowing a reduced comparison of lower order bits to determine the next closest vector.

To facilitate increased performance and capacity, in one embodiment a separate bus, or "backside bus," may be used wherein a dedicated inter-chip communication bus is used to coordinate the functions of the integrated chips on this bus. One chip may be designated as the master with the remaining as slaves to this chip. Parallel operations and coordination of results happens via this dedicated backside bus that each chip is connected to.

An embodiment may include multi-stage pipelining of intra-chip operations to improve system performance. In prior embodiments, the loading of vectors is serially followed by vector recognition and calculation, which is in turn followed by output of results. An embodiment may perform these operations in parallel; for example, the loading of the next vector set occurs while at the same time the current vector set is undergoing recognition, and further the results from the previous vector set are output to the system.

The embodiment may also pipeline multiple fuzzy or exact match results to the output when more than one neuron fires, similar to finding multiple exact matches in data de-duplication comparing hash function tags. Fuzzy matches are determined via an influence field associated with each neuron that specifies the maximum and/or minimum difference in distance between the input vector and the stored neuron vector allowed. For the neuron to fire, or signal it is a fuzzy match, the distance result needs to be within the influence field of that neuron. These distance or firing neuron results may be read out all at once or sequentially, one after the other, providing greater throughput for the system user.

An embodiment of a chip that includes some or all of the above techniques now will be described more fully hereafter with reference to the accompanying drawings. Indeed, these may be represented in many different forms and should not be construed as limited to the embodiments set forth herein; rather, these embodiments are provided by way of example.

FIG. 1 is a diagram of an integrated circuit, according to an embodiment. The circuit contains a system bus interface 104A, 104B, for inputs and outputs, a neuron array 101 for calculating distances, search and sort hardware 107 for finding closest or exact match, logic 105, 106 for preprocessing and post processing of the input or stored data, a configuration table 103A for configuring the device, and a status table 103B that stores status information for an external CPU such as a host processor. The neuron 102 in one embodiment may handle vectors of any length from 32 to 2048 components, with 1 to 64 bits per component. Interfaces 104A, 104B to the external and support logic broadcast a vector that is of variable length and depth to a compatible neuron array of similar breadth and depth-per-neuron.

The system bus interface for inputs and outputs 104A, 104B, may be the same bidirectional bus or separate buses. Information flows from this bus interface to an optional preprocessor at logic block 105 and then broadcast in parallel to an RBF/RCE-based neuron array 101 for calculating distances between input vectors and learned vectors.

Figure 2:
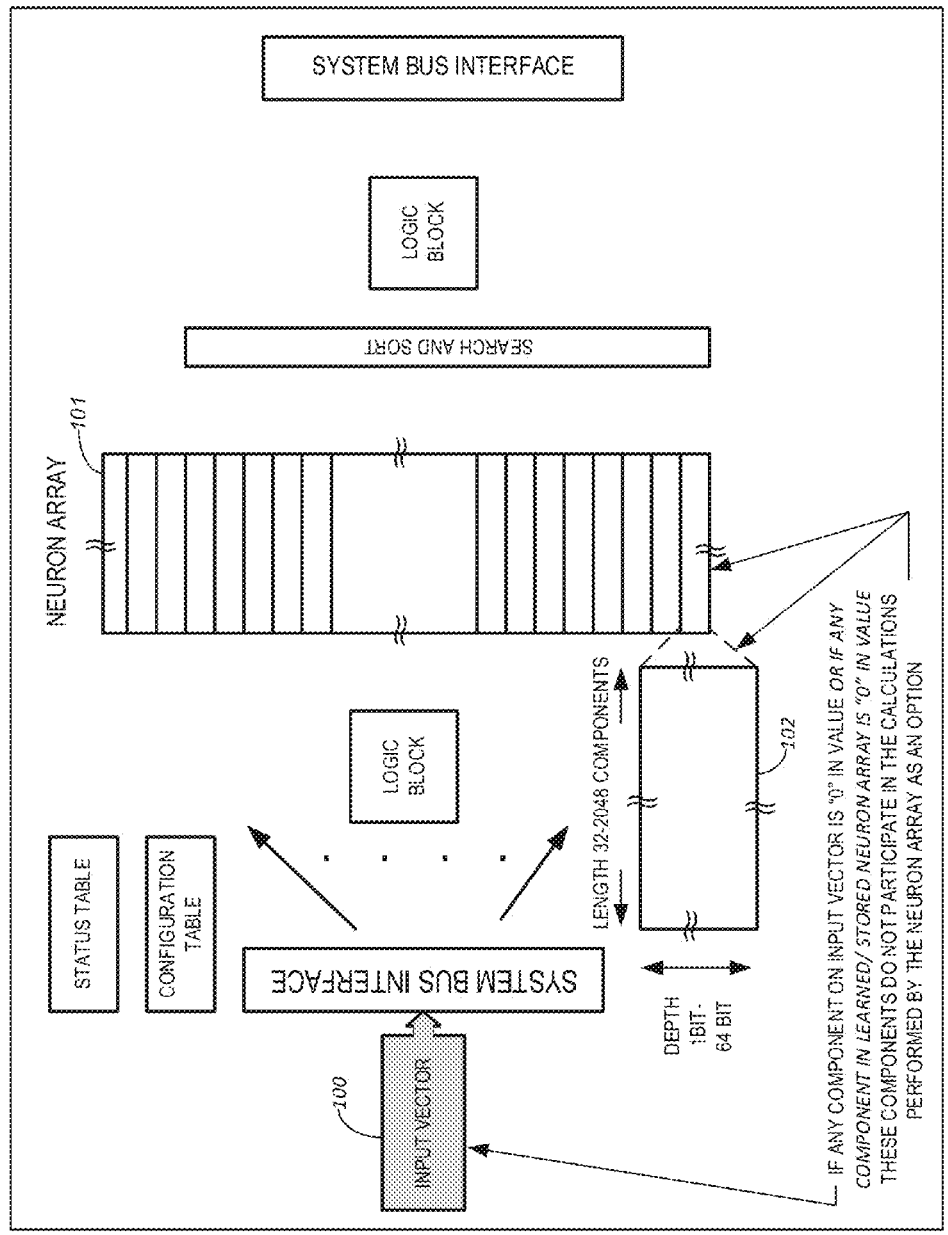
FIG. 2 is a diagram of the integrated circuit of FIG. 1 that provides a feature wherein any of the components in the input vector, stored vectors, or both, have zero (0) value are excluded from the calculation in the neuron array, according to an embodiment.

FIG. 2 is a diagram of the integrated circuit of FIG. 1 that provides a feature wherein any of the components in the input vector 100, stored vectors or both have zero (0) value, according to an embodiment. In one embodiment, this component is not used in calculating the distance between the input and stored vectors. It is desirable in some applications to remove zero value data from consideration, as the zero indicates a null value which if considered would considerably skew the distance calculation results.

Figure 2A:
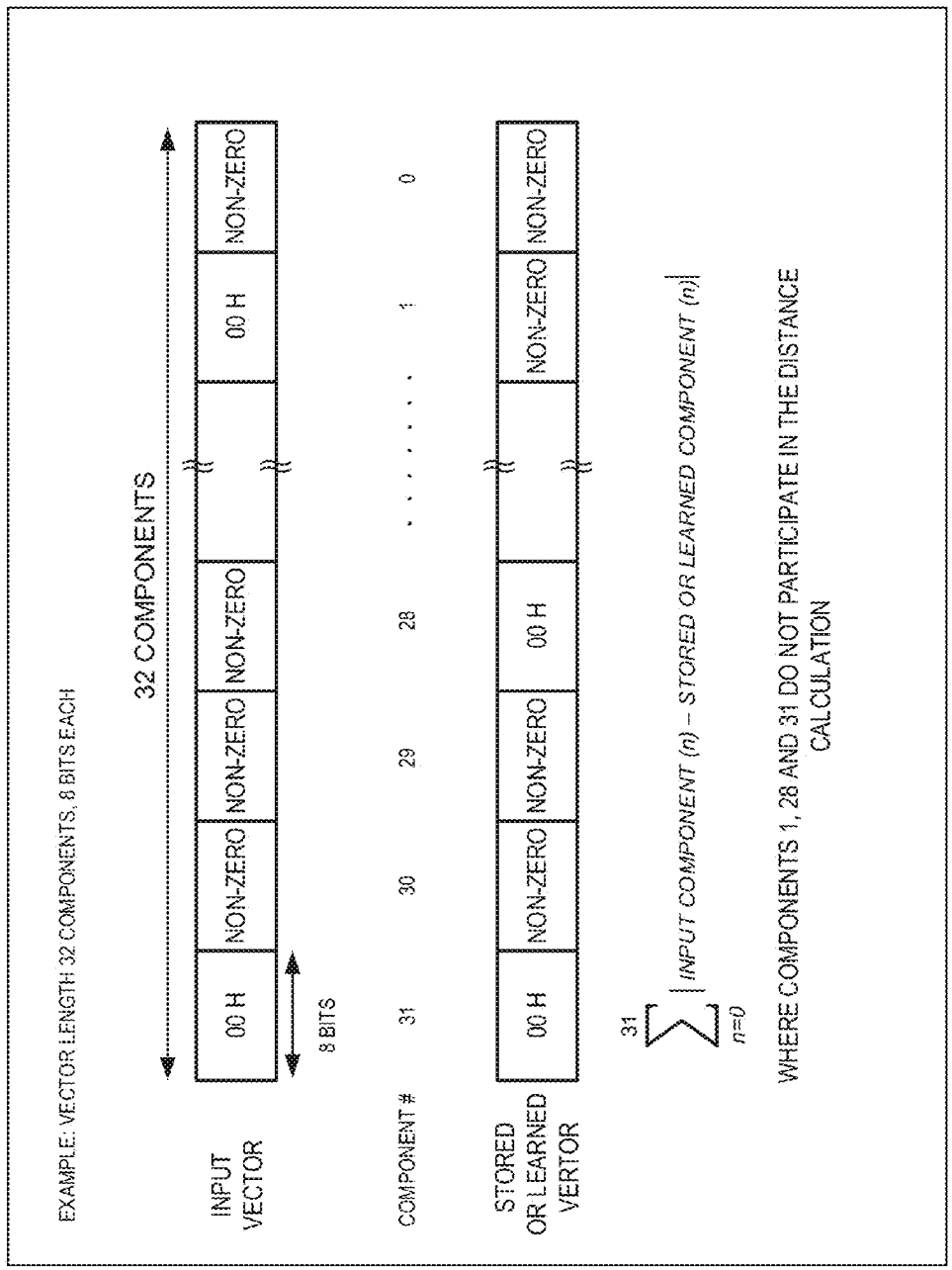
FIG. 2A is a diagram showing an example of excluding components or parts of the components from the distance calculation in FIG. 2, according to an embodiment.

FIG. 2A is a diagram showing an example of excluding components from the distance calculation in FIG. 2, according to an embodiment. In FIG. 2 input vector 100 may be scanned for any OOH component as it comes in on the input and before it is broadcast to the neuron array. Alternatively, neurons of the neuron array 101 may check the input vector for any OOH component after it has been broadcast to the array. Likewise any stored vector (or prototype) in the neuron array 101 may be also scanned for OOH. The scanning may be done using well known comparator hardware logic and may be done serially, or in parallel with circuitry that looks at all bits concurrently. If either the input vector 100, the stored vector in neuron array 101 or both has a 0H ("zero hex") component, it and its counterpart component may be ignored in the distance calculation. The width of the component may vary from 1 binary bit to 64 binary bits. Any component where all of the component bits are zero will be excluded from the calculation, as will the corresponding input or stored component. The distance calculation will be the sum of all components distances, minus the components where an all zeroes condition was found. In the example shown, the distance calculation is the sum of components zero through 31, with components one, 28, and 31 excluded from the calculation.

Figure 3:
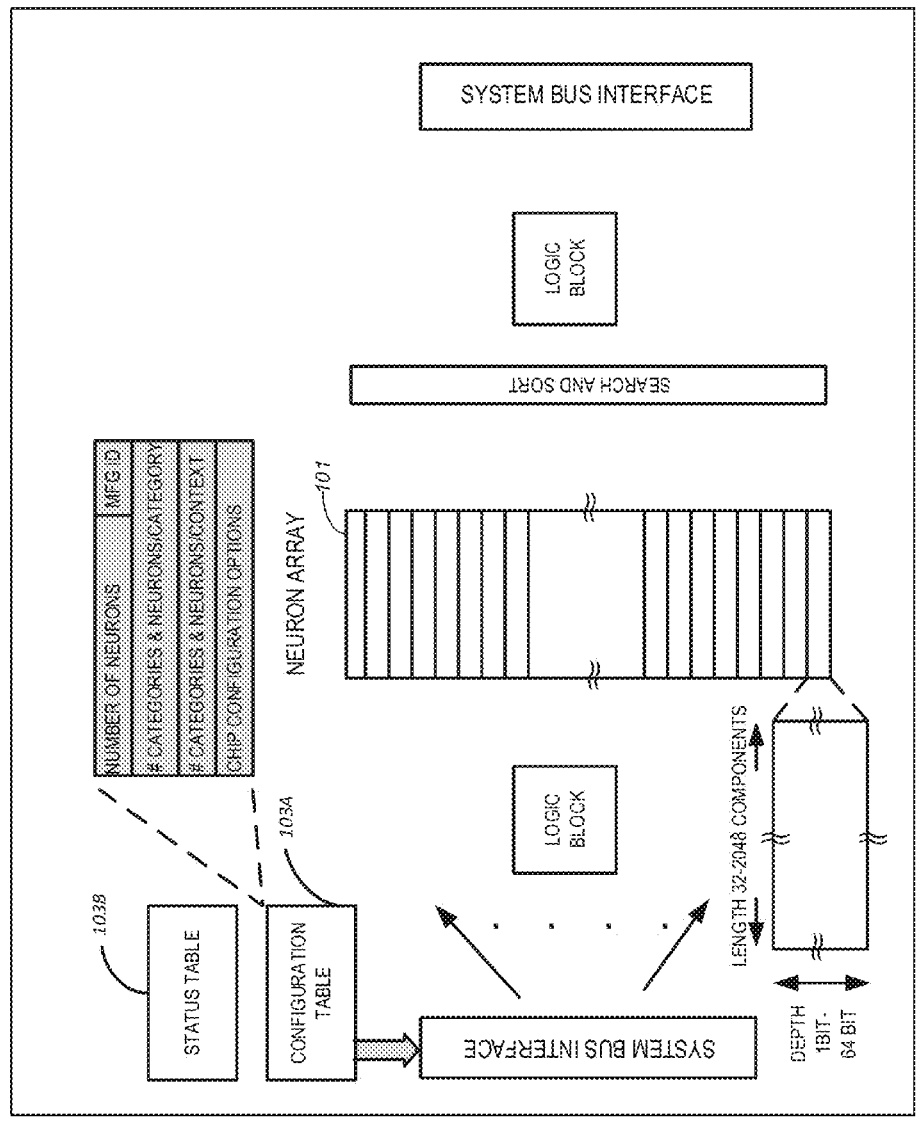
FIG. 3 is a diagram of the integrated circuit of FIG. 1 showing an externally accessible configuration table that may be included on hardware based nonlinear classifier that gives fixed (read only) information about the chip configuration and capabilities. Also shown is an externally accessible status register that provides variable (rewritten in real time) information about the chip status, according to an embodiment.

FIG. 3 is a diagram of the integrated circuit of FIG. 1 showing additional detail of an externally accessible configuration table 103A that may be included on a hardware based nonlinear classifier that gives fixed (read only) information. This configuration table may be RAM, ROM and/or flash based. If it is RAM based, the fixed information may be updated at initialization time from an external non-volatile source. Status table 103B may be included on a hardware-based nonlinear classifier that provides variable (rewritten real time) information about the chip status, according to an embodiment. Real time updates as to the status of the neurons, such as number of categories, neurons per category, number of contexts and neurons per context, for example, are provided to the host through the status table.

Figure 4:
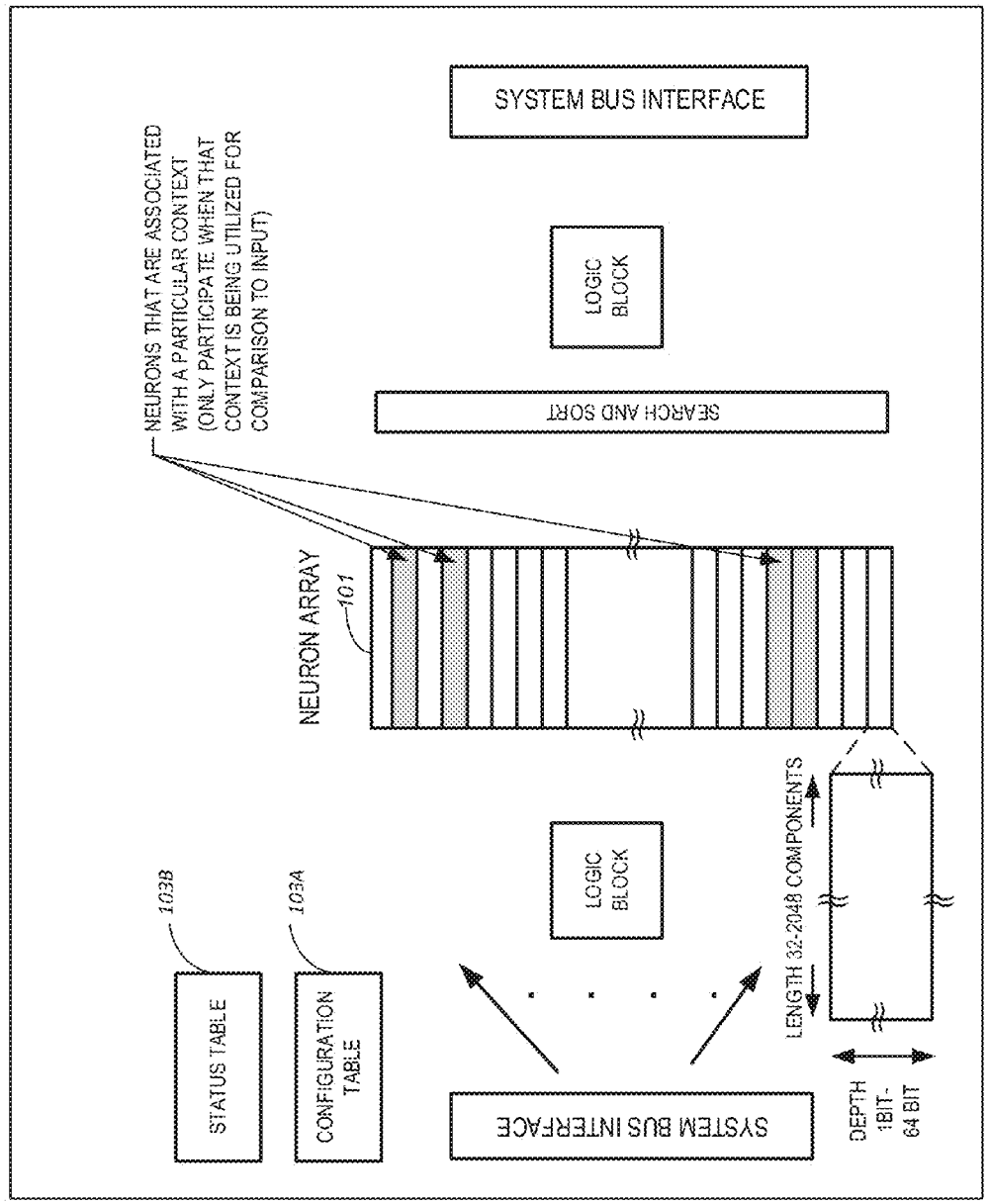
FIG. 4 is a diagram of the integrated circuit of FIG. 1 depicting neurons, which may be contiguous or non-contiguous, that may be associated with a particular context and subset categories that may be able to be cleared and reused as a partial clearing of the chip, according to an embodiment.

FIG. 4 is a diagram of the integrated circuit of FIG. 1 depicting neurons in neuron array 101, contiguous or non-contiguous, that may be associated with a particular context. It may be desired that the neurons consumed by a context be able to be cleared and reused. The neurons comprising a context may reside within one chip or be distributed across multiple chips in an array of chips on a board. That is, the neurons to be cleared may be on one or multiple chips. This operation may be done in parallel or serially. When completed, these neurons may then be available for storing vectors of a different context which may or may not require all the neurons that were cleared. Multiple contexts may also be requested for clearing, and handled in sequence or concurrently.

Figure 5:
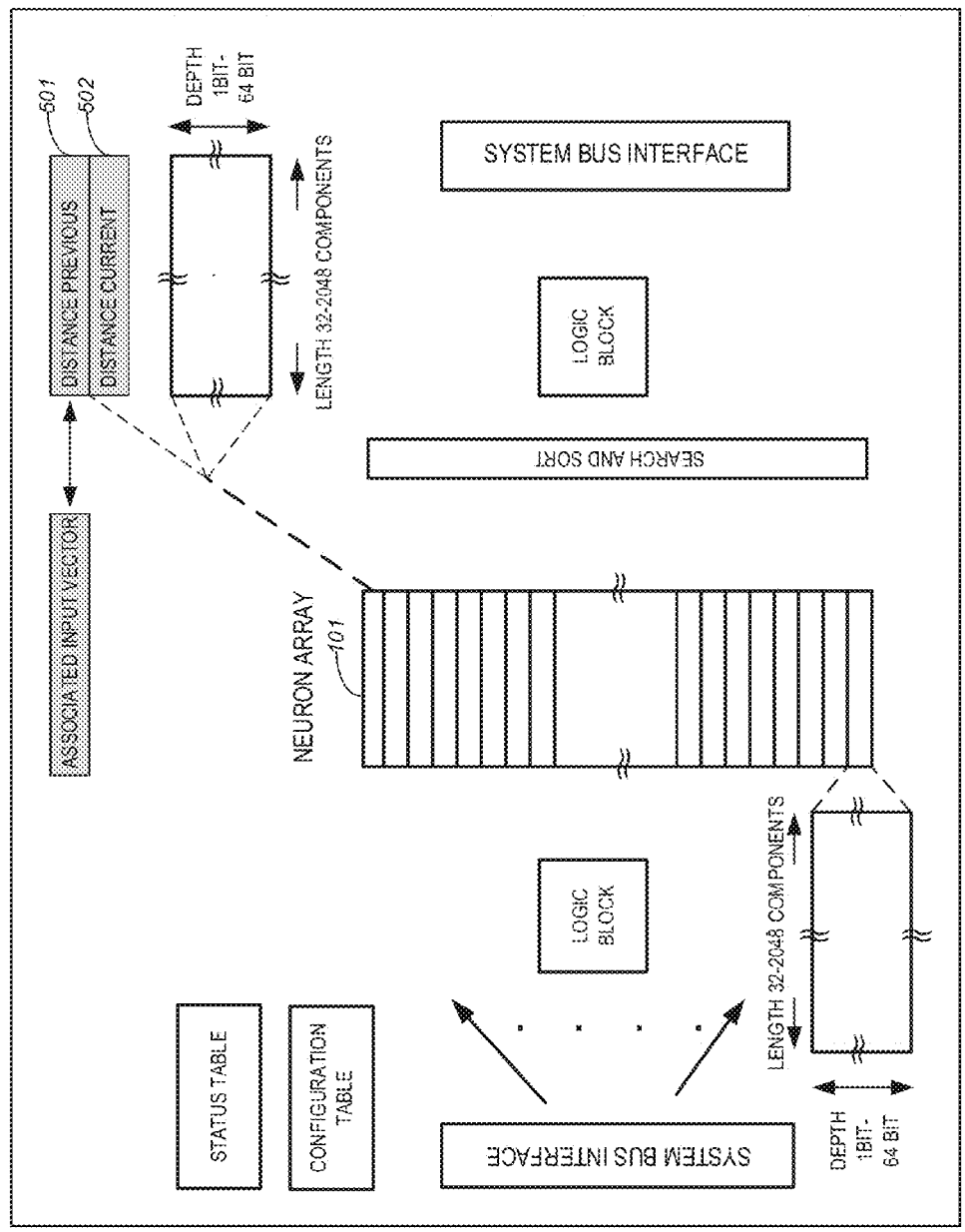
FIG. 5 is a diagram of the integrated circuit of FIG. 1 illustrating individual neurons comprising a set of two registers that stores the distance results, according to an embodiment.

FIG. 5 is a diagram of the integrated circuit of FIG. 1 illustrating individual neurons comprising a set of two registers 501, 502 that store distance results, according to an embodiment. One may be used for storing the current results from the distance calculations. The distance between a learned vector and a new observed vector is often performed using a form of Euclidian or Manhattan distance calculation and results aggregation. One example distance calculation is the Manhattan L1 norm distance, also known as the "taxi cab" distance. In this calculation, the value of each component in the incoming vector is subtracted from the corresponding stored, or learned, vector in the neuron. The absolute values of these calculations are aggregated to form a sum of all component distances. This resulting value, which provides an effective "distance" of the incoming vector from the stored vector, is stored in register 501 along with a vector identification value that identifies the results as belonging to this particular vector. The second register may be kept for each neuron of variable length and depth, and may store the distance of the previous closest result and an identifier for the vector that created the previous closest results. This closest vector may represent a cluster point. Through the keeping of the previous closest results and vector identifier, new cluster points may be presented and a determination made as to whether this new cluster point is closer than previous points, in which case the register will be updated with the new distance and vector identifier. If the new cluster point is found not to be closer than previous cluster points, the register may be left unchanged.

Figure 6:
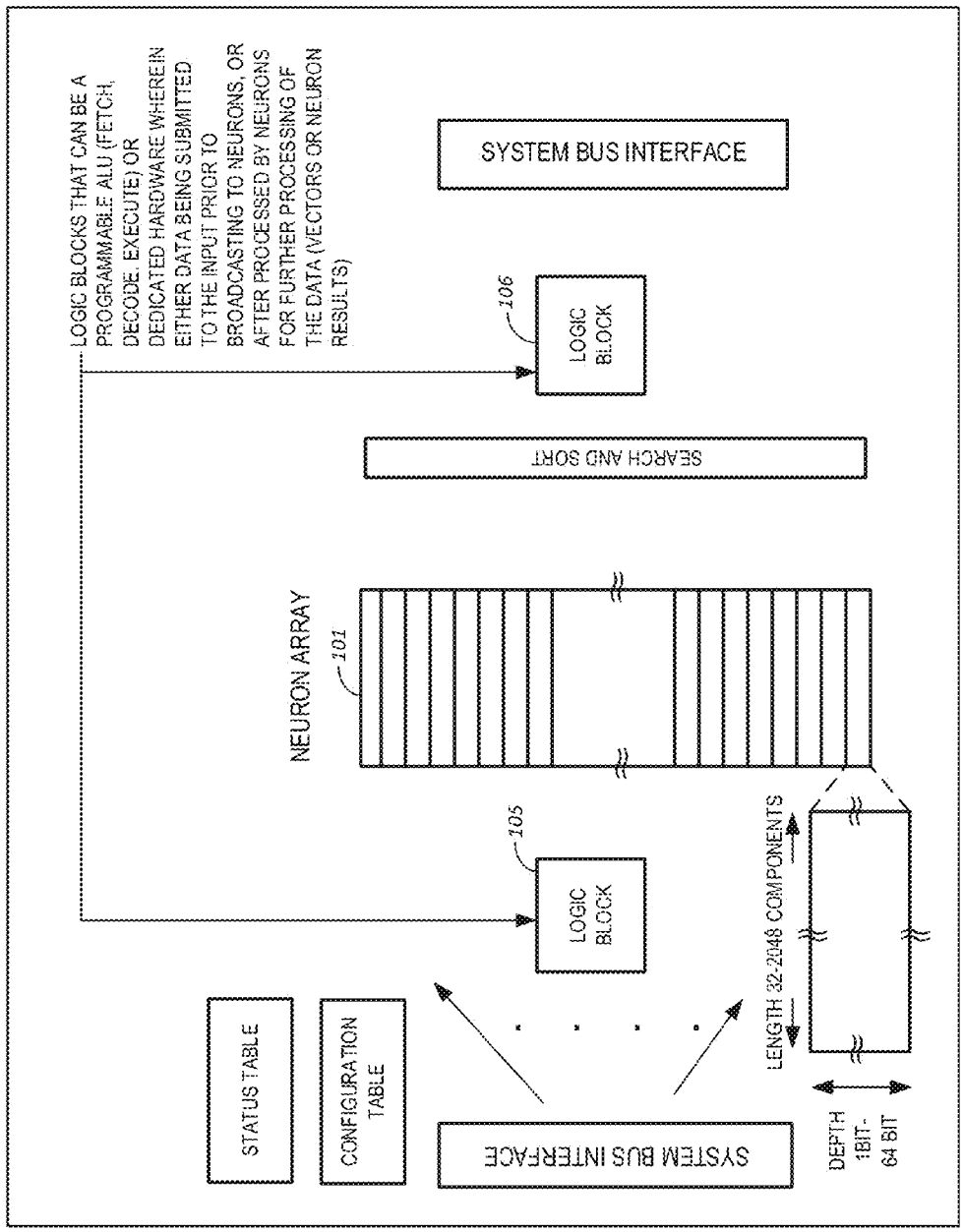
FIG. 6 is a diagram of the integrated circuit of FIG. 1 illustrating preprocessing and/or post processing logic blocks either on the input vector prior to being submitted to the neuron array for calculations or storage or output results after the neuron array calculations or retrieval, according to an embodiment.

FIG. 6 is a diagram of the integrated circuit of FIG. 1 illustrating preprocessing and/or post processing in logic blocks 105, 106 either on the input vector prior to being broadcast to the neuron array 101 for calculations, or prior to the output for post processing of the neuron array results. The processing on the input vector could be used to pre-filter the data, do feature extraction or format the data. The processing on the neuron output results may be for the purpose of implementing a Bayesian statistical classifier in conjunction with the RBF/RCE or kNN operation, or PRCE—probabilistic RCE analysis—as examples.

Figure 7:
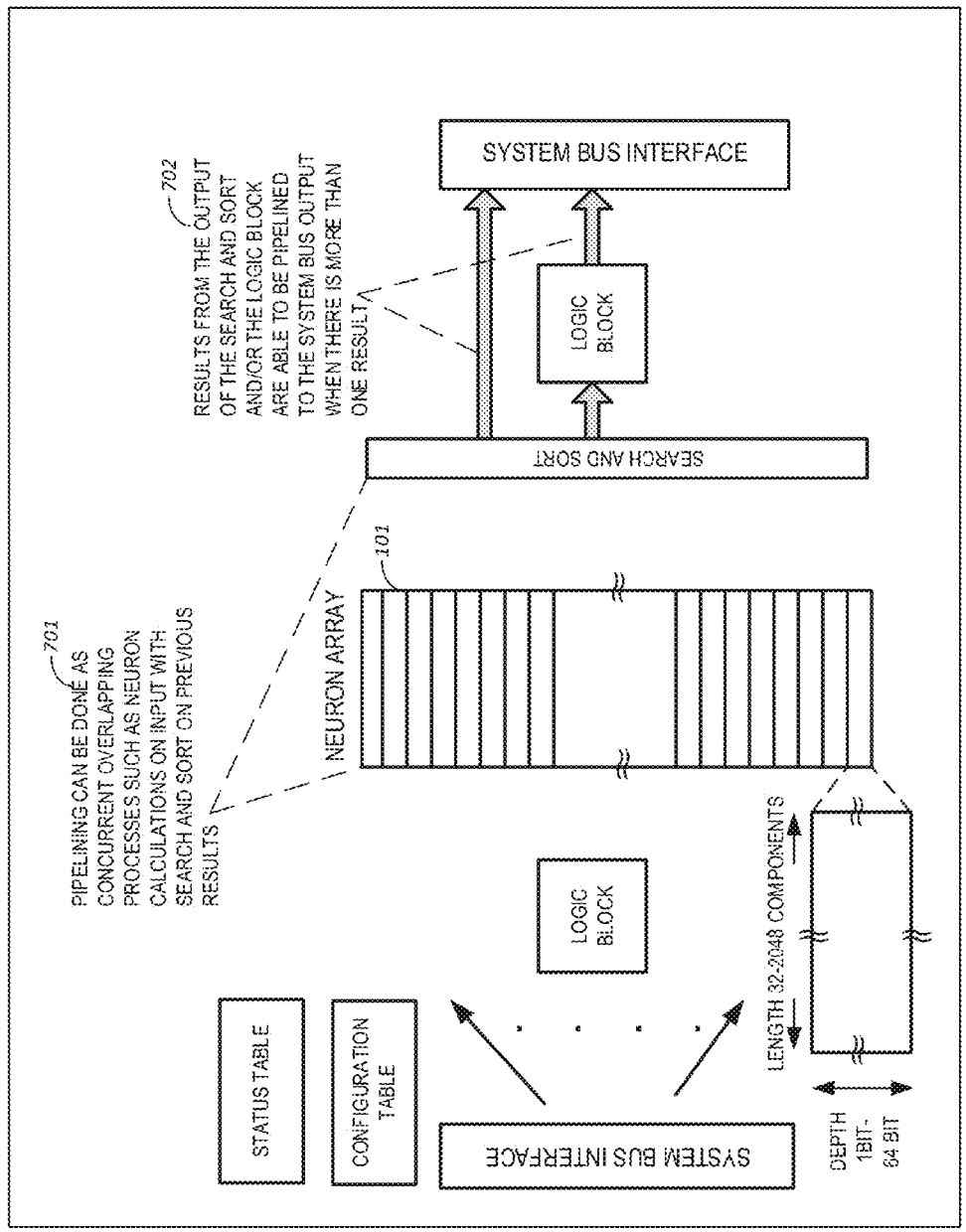
FIG. 7 is a diagram of the integrated circuit of FIG. 1 illustrating the pipelining of results to the output when multiple matches or neuron results may be read out from one operation, according to an embodiment.

FIG. 7 is a diagram of the integrated circuit of FIG. 1 illustrating pipelining of results to the output. Pipelining of the results allows concurrent analysis of the next vector to begin while the system collects the results from the previous vector analysis. Further, multiple matches or neuron results may need to be read out from one operation. Pipelining may also be done on the chip where overlap of operations may be done, such as broadcasting a new vector while the closest match of a current vector may be being determined, and further while the results of a previous vector calculation may be being output to the system.

Figure 8:
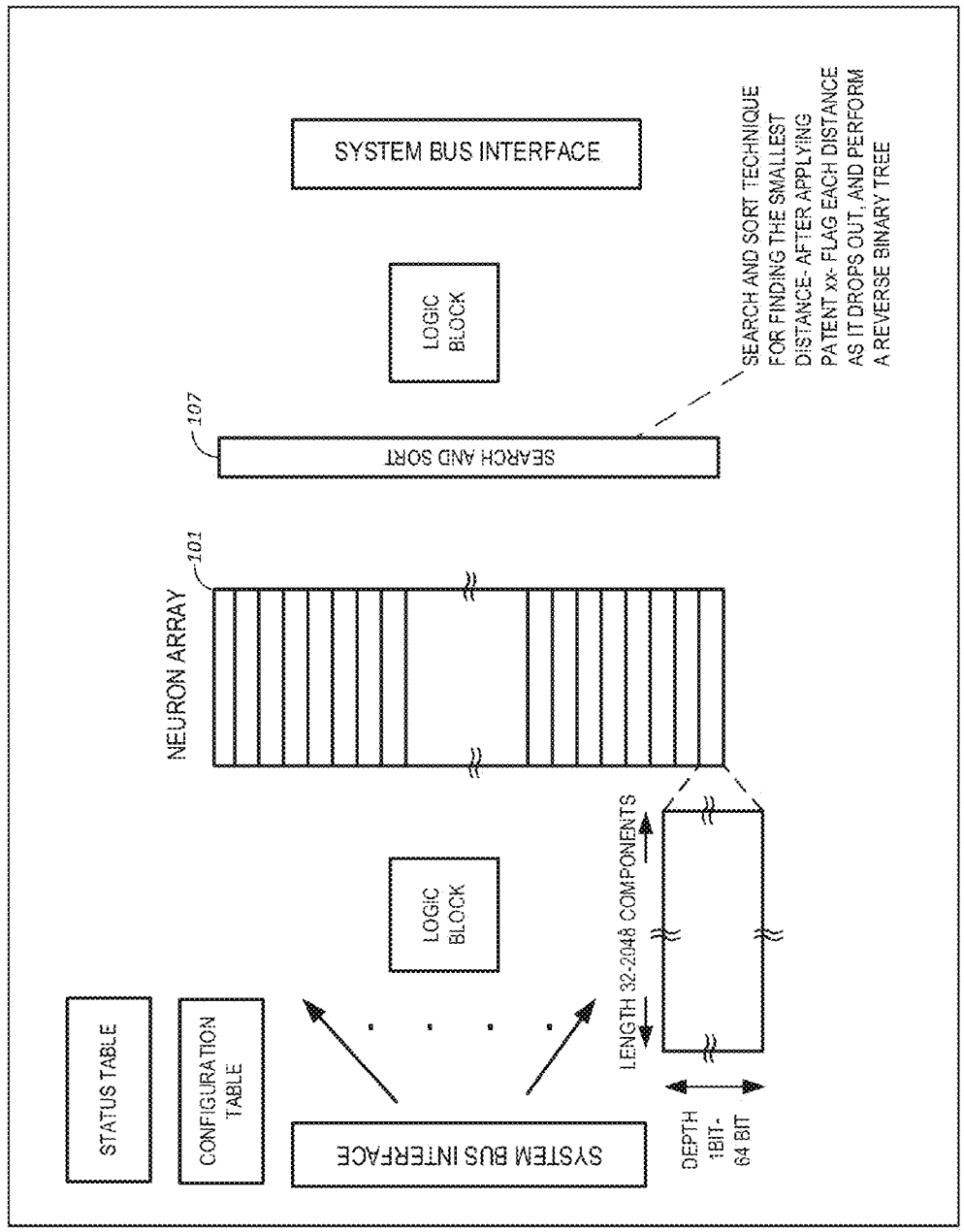
FIG. 8 is a diagram of the integrated circuit of FIG. 1 illustrating search and sort logic using the neuron array distance calculations, according to an embodiment.

FIG. 8 is a diagram of the integrated circuit of FIG. 1 illustrating search and sort logic 107 using the neuron array distance calculations, according to an embodiment. After the neurons have completed the distance calculations, it may be necessary to locate the neuron with the smallest (closest) distance. The search and sort logic performs a binary search algorithm to find the smallest distance. Once found, the neuron with the smallest distance is removed from consideration, and the binary search is repeated to find the neuron with the next smallest distance. This search algorithm is described in detail in the above U.S. Pat. No. 5,740,326.

FIG. 8A is a diagram illustrating an enhanced search and sort technique, according to an embodiment. In the referenced search algorithm, the search for the lowest distance value is performed using a binary search method that begins its search with the Most Significant Bit (MSB), and then proceeds to each next significant bit. As individual bits are presented to the neurons, those with a "1" (High or H) in the specified bit remove themselves from consideration, while those with a "0" (Low or L) remain in contention for the lowest value. All neuron distances are compared in parallel using this binary search algorithm.

In an improvement upon the referenced technique, in the first step of the binary search if there are neurons that have a "1" in the MSB of their distance result and at least one neuron has a "0" in its MSB, then a flag is set representing that this is the bit location from which neurons removed themselves from consideration. The binary search then continues to the next significant bit, repeating the aforementioned process, and again setting a flag when neurons remove themselves from consideration. Thus after the first lowest distance is found, the next larger distance may then be found by "back-tracking" the binary search to the last known digit that presented a "0" result. A binary search between this "back-tracked" bit position and the smallest value bit position is then performed. By using this modified binary search, the time to locate each subsequent lowest value is effectively reduced by one half on average.

Figure 9:
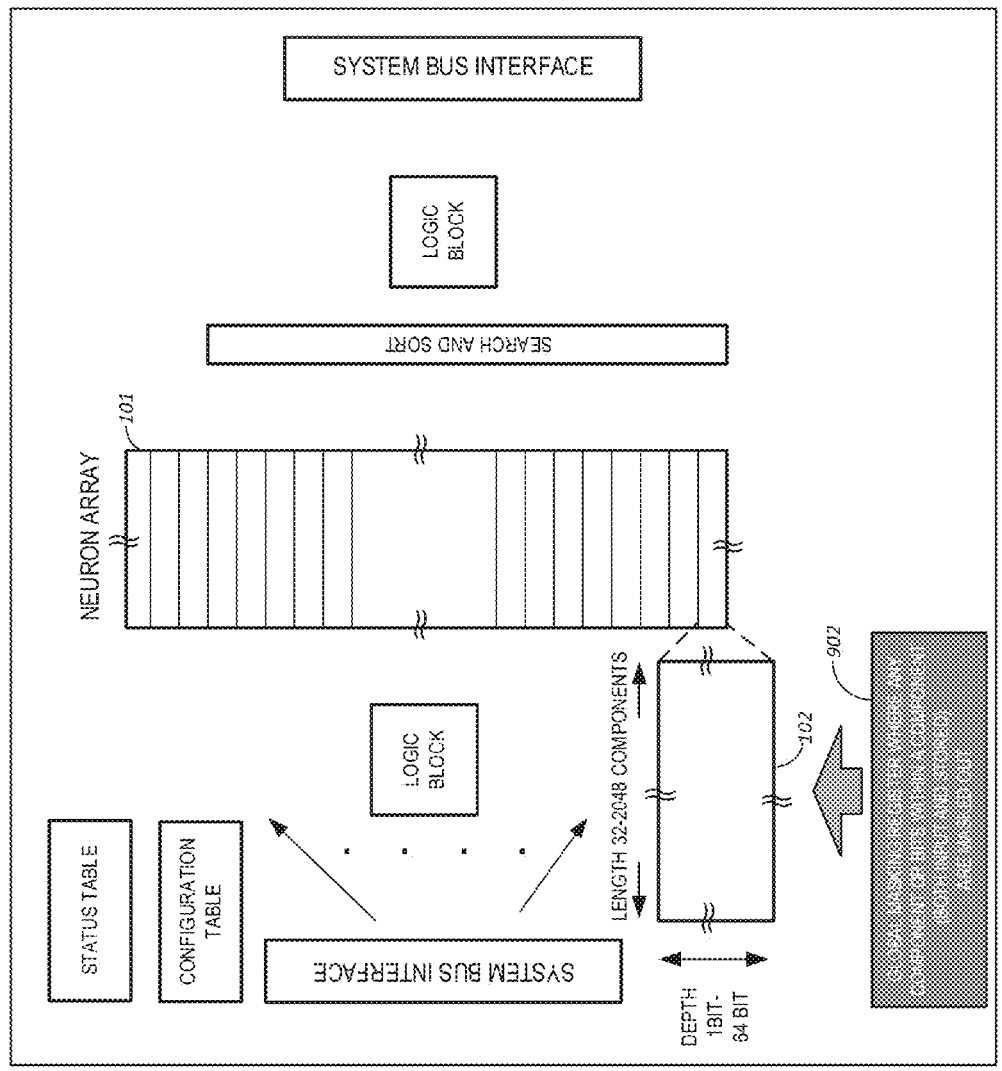
FIG. 9 is a diagram of the integrated circuit of FIG. 1 depicting a global masking register that may be applied to components, sets of components and/or bits of components for exclusion from calculations, according to an embodiment.

FIG. 9 is a diagram of the integrated circuit of FIG. 1 depicting a global masking register 902 that may be applied to components or sets of components for exclusion from calculations, according to an embodiment. This may also include masking of individual bits within a component by making the bits and/or the components a "don't care" field in the neuron operations.

Figure 10:
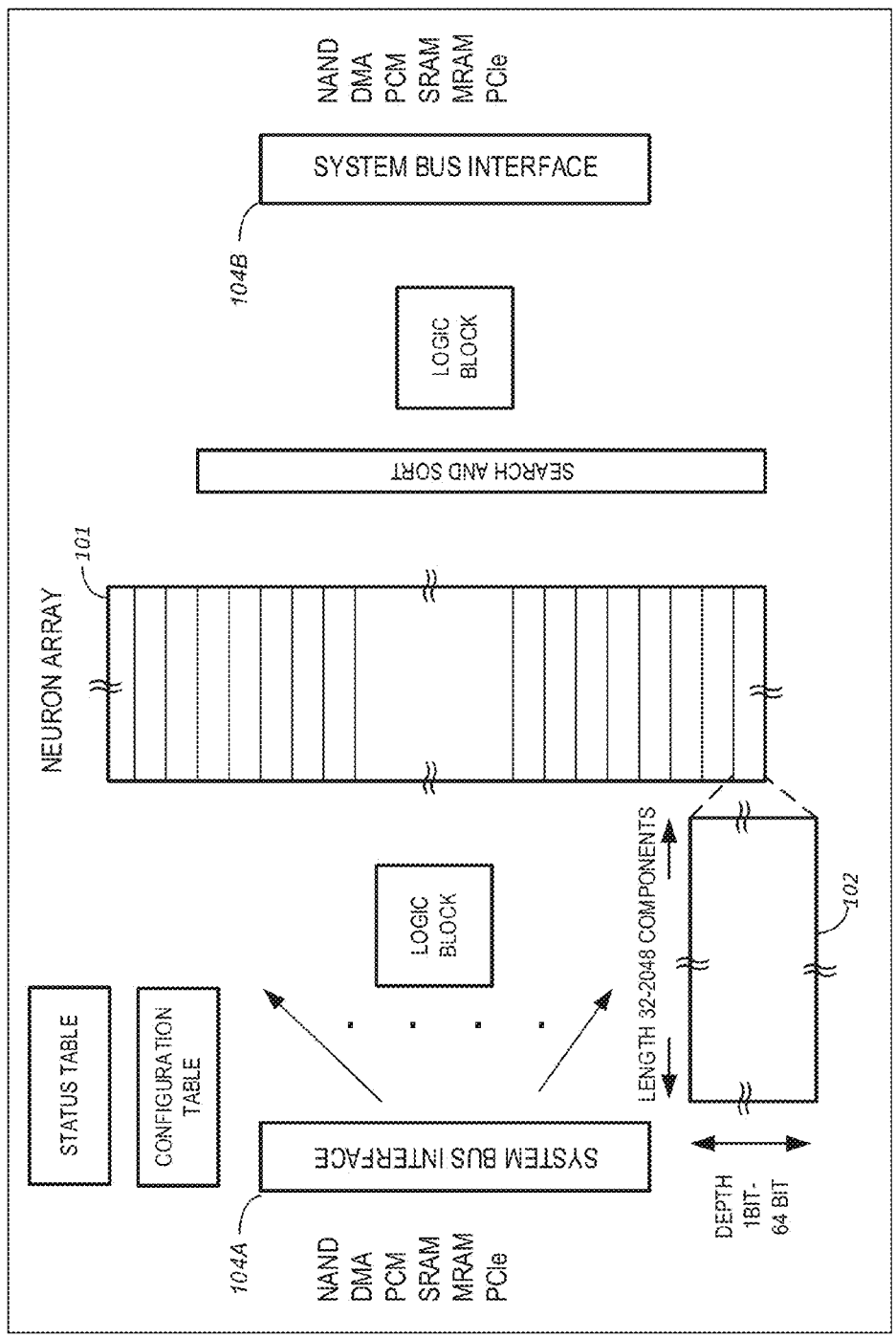
FIG. 10 is a diagram of the integrated circuit of FIG. 1 depicting the integrated circuit having a NAND, DMA, PCIe, DRAM, Phase Change Memory (PCM) MRAM or SRAM compatible interface, according to an embodiment.

FIG. 10 is a diagram of the integrated circuit of FIG. 1 depicting the integrated circuits 104A, 104B having a NAND, DMA, PCIe, DRAM, Phase Change Memory (PCM) MRAM or SRAM compatible interface, according to an embodiment. These standard interfaces may be specified by committees such as ONFi (for non-volatile memory) and/or Jedec memory standardization committees. A combination of the use of a neuron memory heterogeneously in a von Neumann processing environment under the same buses as standard memory may be used to accomplish simple integration into existing systems. System design-in time may be greatly reduced through the use of industry-standard memory interfaces. The input/output interfaces 104A, 104B may be on one set of pins or two separate sets of pins. Neuron memory, which is an associative memory by nature, does not naturally fit into von-Neumann memory interfaces. The additional memory interface logic will help ease usage of the neuron memory in existing system design and memory interface controllers. By combining the attributes of an associative memory with the physical direct addressability of a von Neumann memory, which can be random, block or sequentially accessible, a new capability is provided that provides high-speed memory access as well as content associative access to the neuron memories.

Figure 11:
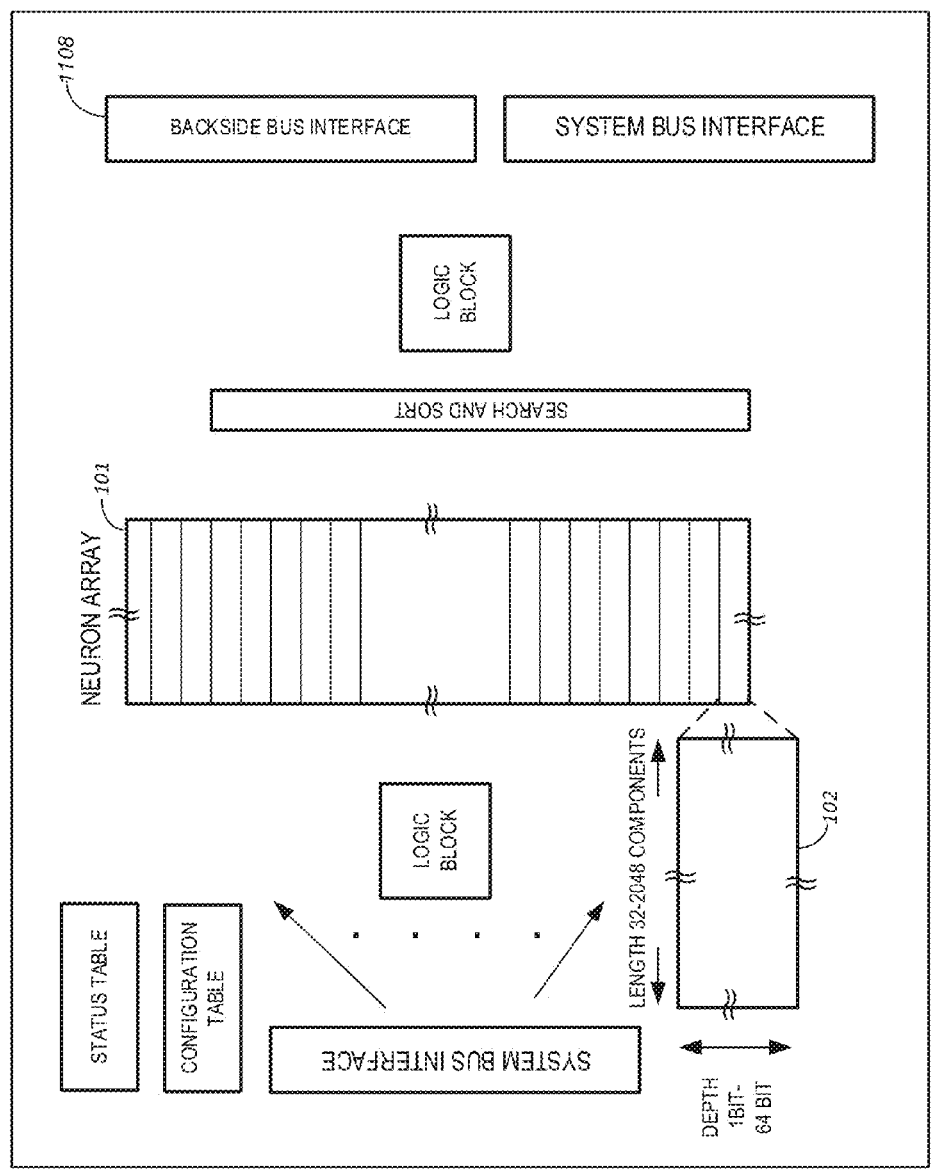
FIGS. 11 and 11A are diagrams illustrating a backside bus which may be used to connect chips covered by this disclosure together for inter-chip communications, according to an embodiment.
Figure 11A:
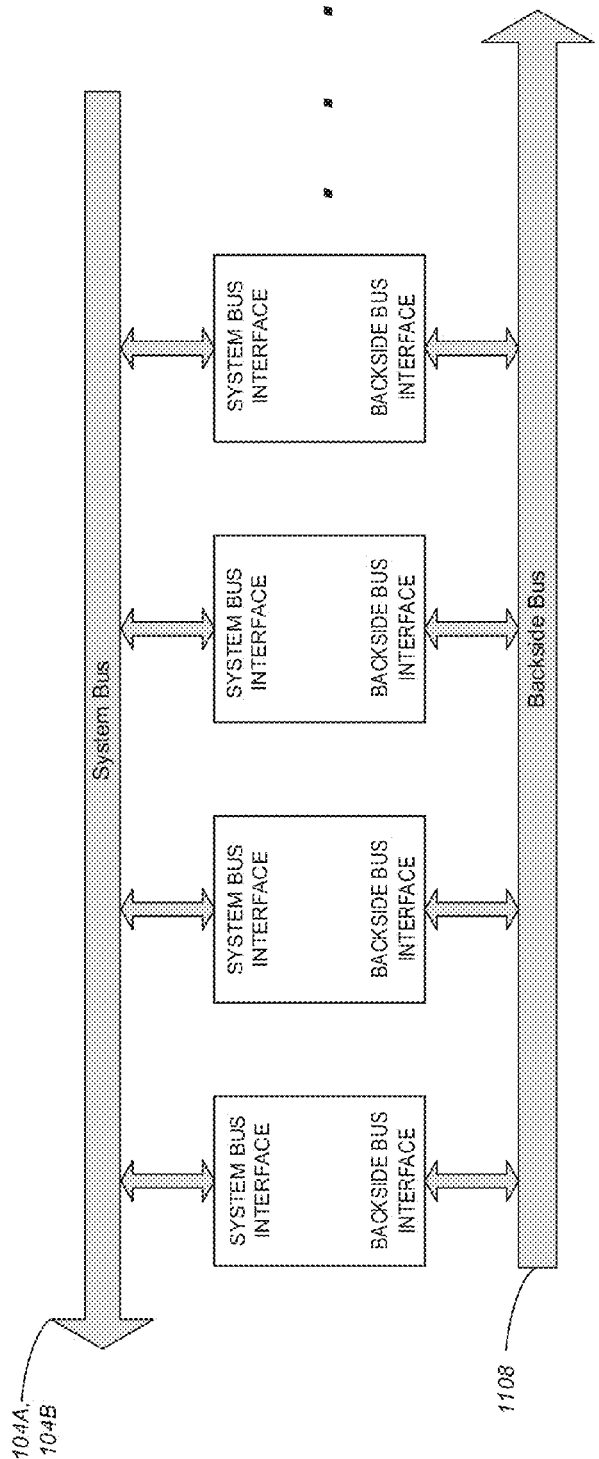

FIGS. 11 and 11A are diagrams illustrating a backside bus which may be used to connect chips covered by this disclosure together for inter-chip communications, according to an embodiment. FIG. 11 illustrates a backside bus 1108 which may be used to connect chips such as those discussed above together for intercommunications between chips. This extra bus interface may be its own proprietary bus or a repurposed input/output bus. One purpose of this bus may be to provide a means for communication between chips to support intermediate calculations, coordination of neuron operations, and analysis of results. It may be serial or parallel. FIG. 11A illustrates multiple chips connected to system bus 104A, 104B for communication to a host controller. The chips are also connected by the aforementioned backside bus 1108 for inter-chip communication that may be independent from the communication occurring on the system bus.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A nonlinear neuron classifier comprising:
a neuron array that comprises a plurality of neurons that have variable component length and variable depth, and that processes an input vector of variable component length and variable component depth that is input into the classifier for comparison against vectors stored in the classifier;
a system bus interface configured to detect and capture the input vector; and
logic that is connected in parallel to individual neurons in the classifier and that broadcasts the input vector concurrently to neurons that store vectors of similar component length and depth, for vector distance calculations.

2. The nonlinear neuron classifier of Claim 1, wherein the classifier operates in accordance with a Radial Basis Function (RBF) algorithm with Restricted Coulomb Energy (RCE) learning, or a k-Nearest Neighbors (kNN) algorithm.

3. The nonlinear neuron classifier of claim 1 further comprising hardware to detect a component of the input vector of the stored vector that has a value of zero and that excludes the detected component from being used in the vector distance calculations.

4. The nonlinear neuron classifier of claim 1 further comprising storage configured as an internal configuration table that is accessible by hardware external to the classifier, the configuration table comprising a combination of registers of varied length and configured to store one of the identity of manufacturer of the classifier, the number of neurons in the classifier, the vector component length and vector depth of neurons in the classifier, a masking mode and a mask to apply to incoming data, performance parameters of the nonlinear classifier, and an algorithm to be used during vector learning and vector recognition.

5. The nonlinear neuron classifier of claim 1 further comprising storage configured as an internal status and results table that is accessible by hardware external to the classifier, the status and results table comprising a combination of registers of varied length configured to store one of the identity of a neuron that meets specific criteria, the number of neurons committed to different contexts, the number of contexts, the number of categories and the number of neurons per category.

6. The nonlinear neuron classifier of claim 1, wherein an external computer processor can clear a first context of a stored vector and replace the first context with a new context.

7. The nonlinear neuron classifier of claim 6, wherein the external processor stores data in the new context.

8. The nonlinear neuron classifier of claim 1 further comprising a first distance register and a second distance register each coupled with individual neurons, wherein the first distance register is configured to store distance results from current vector distance calculations and the second distance register is configured to store results from previous vector distance calculations, the results from current vector distance calculations, and the results from previous vector distance calculations that are stored in the second distance register, being compared, the contents of the second distance register being updated to store the results of the current vector distance calculations if the results of the current vector distance calculations are less than the results of the previous vector distance calculations that are stored in the second distance register.

9. The nonlinear neuron classifier of claim 8 wherein a previous clustering point or input vector may be identified in a neuron so that neuron vectors may be clustered around a closest input vector.

10. The nonlinear neuron classifier of claim 8 wherein the broadcasted input vector represents a clustering point in a K-Means clustering algorithm if the results of the current vector distance calculations is less than the results of the previous vector distance calculations.

11. The nonlinear neuron classifier of claim 8 wherein the category of the stored vector is changed to the category of the broadcast vector, if the result of the current vector distance calculations caused the content of the second register to be updated in the second register.

12. The nonlinear neuron classifier of claim 1 wherein one of a microcontroller core a custom arithmetic logic unit or other logic may be added to one or more of the input or the output of the classifier and configured to preprocess or post processing post-process the vector to be searched and pattern-classified by the neural array.

13. The nonlinear neuron classifier of claim 12 wherein the classifier performs mathematical operations on the results of the vector distance calculations by using one of a plurality of neurons firing in the classifier, neuron distance, or an influence field associated with the one neuron.

14. The nonlinear neuron classifier of Claim 13 wherein the mathematical operations are probabilistic operations.

15. The nonlinear neuron classifier of claim 1 wherein neurons in the neuron array include identifiers, k number of exact matches are found in the vector distance calculations, and the neuron identifier of each of the k exact matches are read out via the output of the classifier.

16. The nonlinear neuron classifier of claim 1 further comprising search and sort logic to search and sort the calculated vector distances using an accelerated binary search to find subsequent minimum vector distances after a first minimum vector distance is determined.

17. The nonlinear neuron classifier of claim 1 wherein individual neurons perform one of a square operation by shifting bits in a distance calculator one location to the left, or a square root operation by shifting bits in the distance calculator one location to the right.

18. The nonlinear neuron classifier of claim 1 further comprising a global masking register that is configured to apply the contents of the global masking register to individual categories or contexts to exclude components or subsets of components from the comparison for vector distance calculations.

19. The nonlinear neuron classifier of claim 18 wherein the contents of the masking register can be applied to a selected bit within a component.

20. The nonlinear neuron classifier of claim 18 wherein the contents of the masking register can be applied to selected groups of bits within a component.

21. The nonlinear neuron classifier of claim 1 further comprising a NAND flash compatible input/output interface.

22. The nonlinear neuron classifier of claim 1 further comprising a Direct Memory Access (DMA) controller interface where blocks of data can be transferred into the classifier or out of the classifier to external Random Access Memory (RAM) comprising one of NOR, Flash, Static Random Access Memory (SRAM), Pseudo Static Random Access Memory (PSRAM), Magnetoresistive Random Access Memory (MRAM), Phase Change Memory or memristors, or Dynamic Random Access Memory (DRAM).

23. The nonlinear neuron classifier of claim 1 further comprising a Peripheral Component Interconnect Express (PCIe) compatible interface.

24. The nonlinear neuron classifier of claim 1 further comprising a DRAM compatible interface.

25. The nonlinear neuron classifier of claim 1 further comprising a Phase Change Memory interface.

26. The nonlinear neuron classifier of claim 1 further comprising a MRAM or SRAM compatible interface.

27. The nonlinear neuron classifier of claim 1 further comprising a backside bus configured to communicate between a plurality of integrated circuits each comprising a neuron array wherein one of the plurality of integrated circuits is a master neuron integrated circuit and others of the plurality of neuron integrated circuits are slaves to the master neuron integrated circuit, and the backside bus is electrical or optical, the master and slave being on one circuit board or on a plurality of connected circuit boards.

28. The nonlinear neuron classifier of claim 1 further comprising volatile or non-volatile memory technologies comprising one of MRAM, DRAM, memristor, Phase Change Memory, NOR Flash and NAND for the storing of vectors in the neuron array.

29. A method comprising:
storing a plurality of vectors of variable component length and variable depth in a neuron classifier comprising neurons of variable component length and variable depth;
receiving an input vector of variable component length and variable depth by individual neurons of the neuron classifier; and
processing the input vector by at least some of the individual neurons to calculate vector distances between the input vector and one of the stored first vectors.

30. The method of claim 29 further comprising detecting a component of the input vector or of a stored vector that has a value of zero and excluding the detected component from being used in the vector distance calculations.

31. The method of claim 29 further comprising identifying and storing at least one of the identity of the manufacturer of the classifier, the number of neurons in the classifier, the vector component length and vector depth of neurons in the classifier, a masking mode and a mask to apply to incoming data, performance parameters of the nonlinear classifier, and an algorithm to be used during vector learning and vector recognition.

32. The method of claim 29 further comprising identifying and storing at least one of a neuron that meets specific criteria, the number of neurons committed to different contexts, the number of contexts, the number of categories and the number of neurons per category.

33. The method of claim 29 further comprising receiving signals by the neuron classifier to clear a first context of at least one of the plurality of stored vectors, replace the first context with a new context, and store data in the new context.

34. The method of claim 29 further comprising storing results from current vector distance calculations in a first register and storing results from previous vector distance calculations in a second register, comparing the results from the current vector distance calculations and the results from the previous vector distance calculations, and updating contents of the second register to store the results of the current vector distance calculations if the results of the current vector distance calculations are less than the results of the previous vector distance calculations.

35. The method of claim 34 wherein the contents of a global masking register are applied to individual categories or contexts to exclude components or subsets of components from the comparison of results of vector distance calculations.

36. The method of claim 35 further comprising applying the contents of the masking register to one of a selected bit within a component or selected groups of bits within a component.

37. The method of claim 34 further comprising changing the category of a stored vector to the category of the input vector, if the result of the current vector distance calculations caused the content of the second register to be updated.

38. The method of claim 29 further comprising performing mathematical operations on the results of the vector distance calculations by one of a plurality of neurons firing in the classifier, neuron distance, or an influence field associated with the one of the plurality of neurons.

39. The method of claim 38 wherein the mathematical operations are probabilistic operations.

40. The method of claim 29 wherein neurons in the neuron array include identifiers, find k number of exact matches in the vector distance calculations, and the neuron identifier of each of the k exact matches are stored for read out via the output of the classifier.

41. The method of claim 29 wherein the calculated vector distances are searched and sorted using an accelerated binary search to find subsequent minimum vector distances after a first minimum vector distance is determined.

* * * * *